(No Model.)  A. T. BROWN.  5 Sheets—Sheet 3.
TYPE WRITING MACHINE.
No. 436,333.   Patented Sept. 16, 1890.
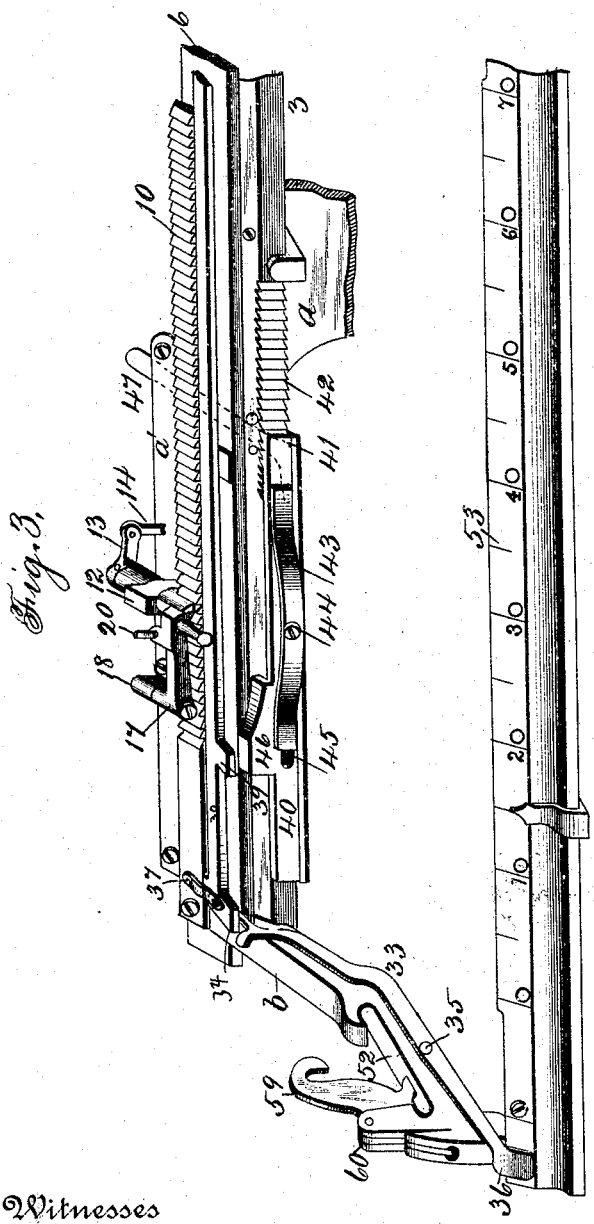
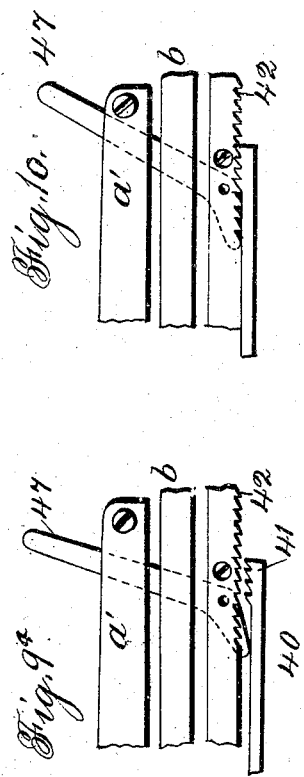
Witnesses
Alexander T. Brown
Inventor (No Model.) 5 Sheets—Sheet 4.
A. T. BROWN.
TYPE WRITING MACHINE.
No. 436,333. Patented Sept. 16, 1890.
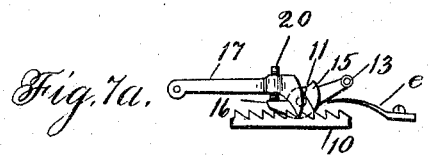
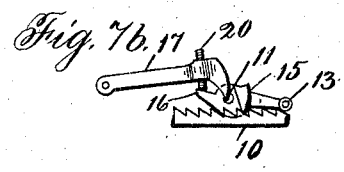
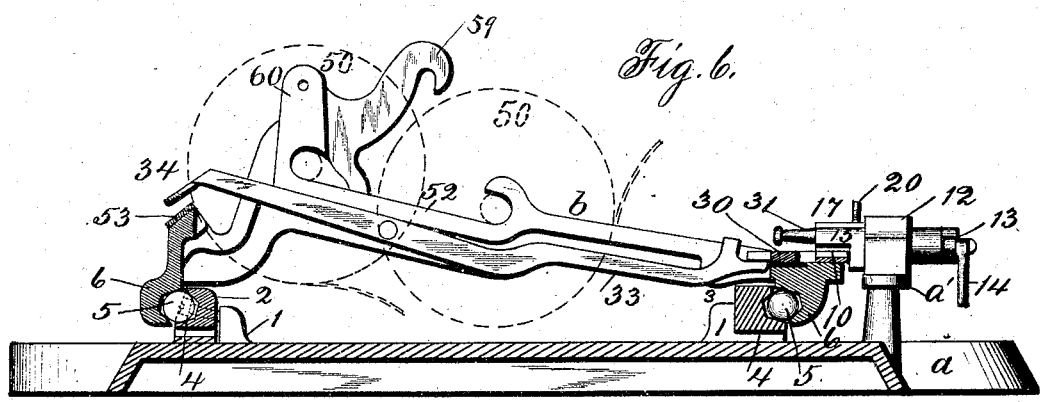
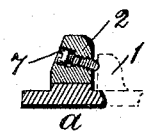
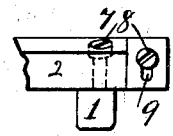
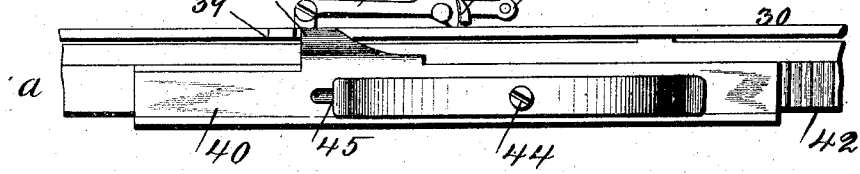
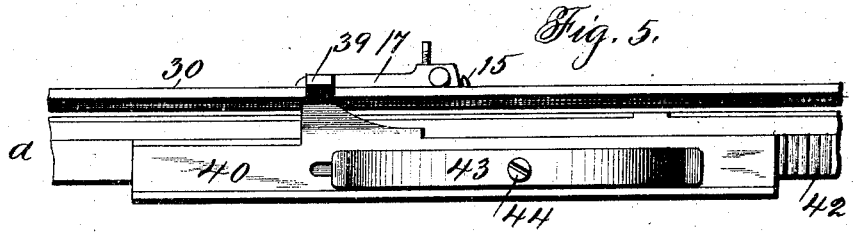
Witnesses
C E Dennison
H McMurchy
Alexander T Brown
Inventor (No Model.) 5 Sheets—Sheet 5.
A. T. BROWN.
TYPE WRITING MACHINE.
No. 436,333. Patented Sept. 16, 1890.
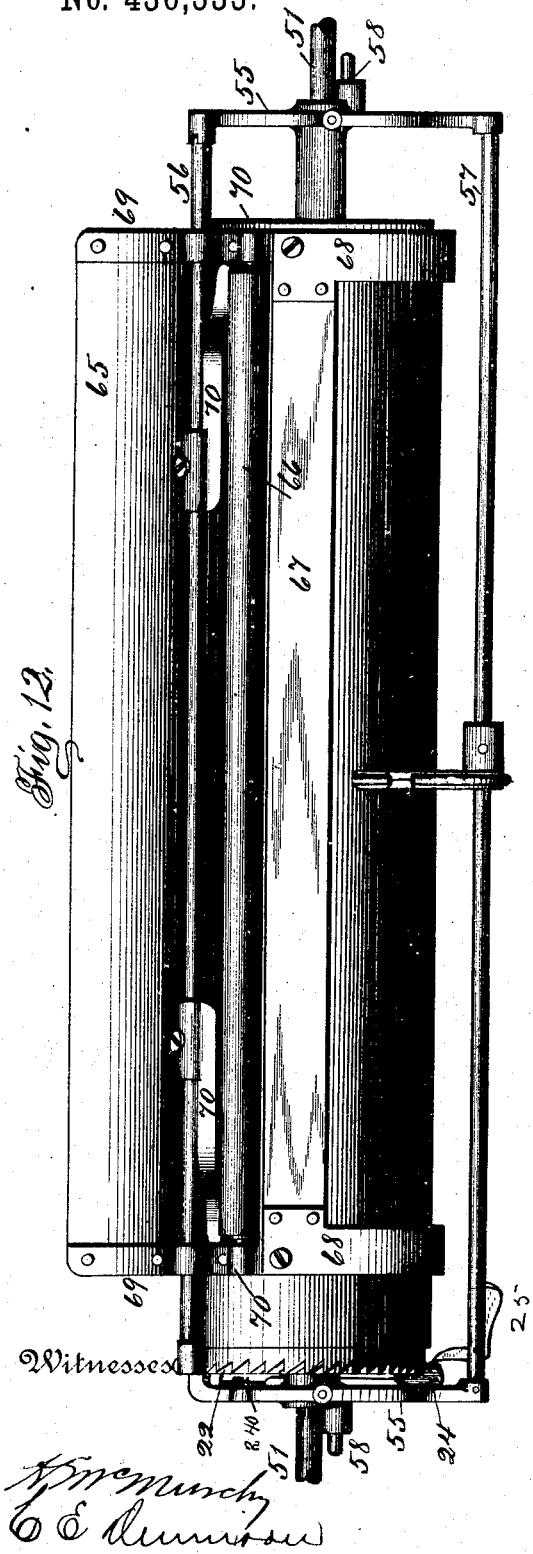
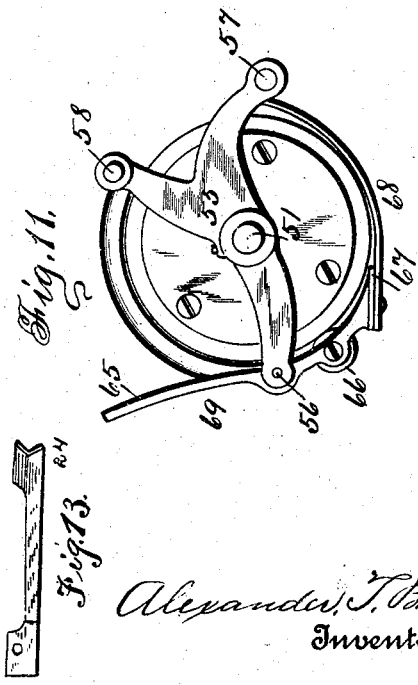
Witnesses:
Alexander T. Brown
Inventor

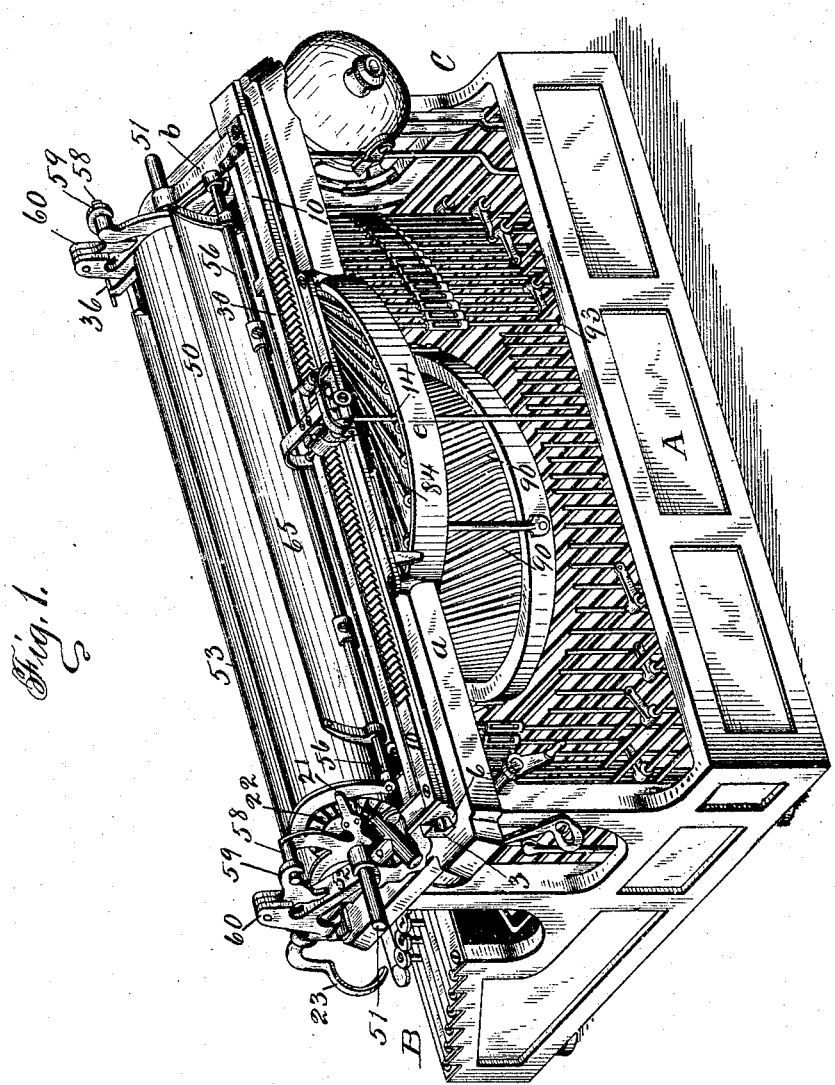

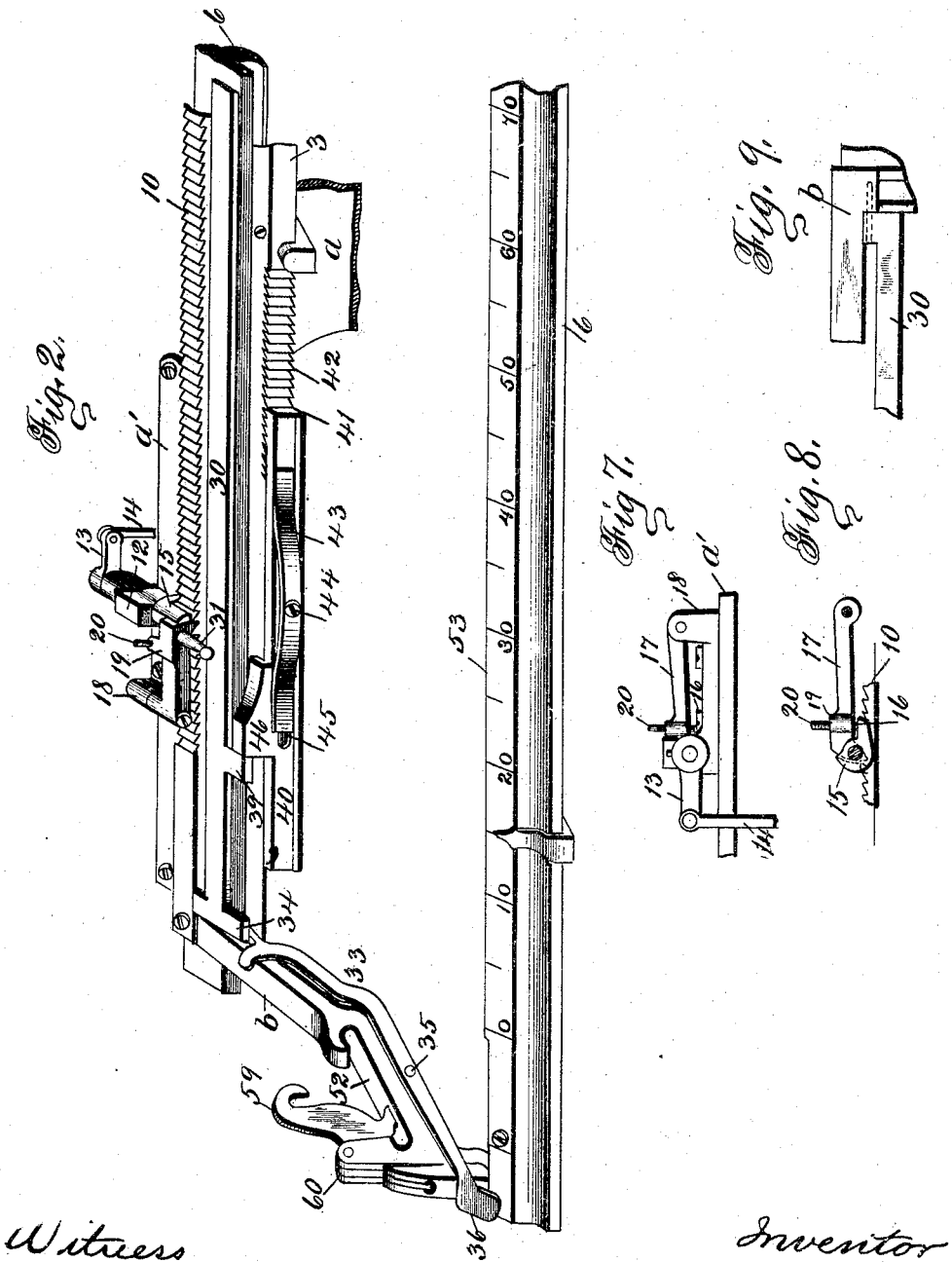

UNITED STATES PATENT OFFICE.

ALEXANDER T. BROWN, OF SYRACUSE, NEW YORK.

TYPE-WRITING MACHINE.

SPECIFICATION forming part of Letters Patent No. 436,333, dated September 16, 1890.

Application filed January 18, 1890. Serial No. 337,338. (No model.) Patented in Belgium February 25, 1890, No. 67,162.

*To all whom it may concern:*

Be it known that I, ALEXANDER T. BROWN, residing at Syracuse, in the county of Onondaga and State of New York, have invented certain new and useful Improvements in Type-Writing Machines, (for which I have obtained Letters Patent in Belgium, dated February 25, 1890, No. 67,162,) of which the following is a specification, reference being had therein to the accompanying drawings.

This invention relates to type-writing machines.

The object of the invention is to improve the carriage and its mounting, the escapement, and the mechanism for holding and controlling the paper on the roll or platen, and generally to improve the upper part of the machine.

The improvements have been devised in connection with a machine heretofore invented by me, but obviously many of the present improvements are of general utility.

Figure 1 is a rear perspective view of a machine formerly invented by me, partly broken away to show the arrangement of type-levers. Fig. 2 is a broken front perspective view of the roller-carriage, showing escapement, the paper-roller or "platen" omitted. Fig. 3 is a broken perspective of same carriage with escapement in different position. Fig. 4 is a broken elevation from the front of rear rail of the carriage and margin regulator or gage. Fig. 5 is a similar view with rocker-bar raised. Fig. 6 is a cross-section of the top plate of the machine and carriage, the position of the paper-roller being indicated in dotted lines. Figs. 7 and 8 are details of the escapement, and Fig. 9 a broken detail showing pivot of rocker-bar. Fig. 6$^a$ is a section showing set-screw for adjustable track. Fig. 6$^b$ is a broken plan of one end of adjustable track. Figs. 7$^a$ and 7$^b$ are elevations of escapement-pawls, looking toward the rear of the machine. Figs. 9$^a$ and 10 are broken details of part of the bottom of the carriage, showing catch of margin regulator or gage. Fig. 11 is an end view of the paper-roller or platen and cradle removed from the carriage. Fig. 12 is a bottom view of roller-cradle and attachments. Fig. 13 is a detail partial perspective view of spring-pawl 24.

The letter $a$ designates the top plate of the machine and $a'$ a bar above the plate. This plate carries studs 1 1, extending upward, and the guiding-rails 2 and 3 are attached to these studs.

The guide-rails 2 and 3 are grooved on opposite side faces, and one of these rails is adjustable away from the other by set-screws 7 or by other suitable means.

The inner side of the parallel side rails of the carriage $b$ are grooved to correspond with the guide-rails, and steel balls 5 are interposed in the grooves. The weight of the carriage is thus borne on the balls 5, running in the grooves, and the adjustable track or guide-rail can be set up to hold the carriage firmly in position without binding. The adjustable rail is held to the top plate by screws 8, passing through slots 9 in the rail. (See detail plan, Fig. 6$^b$.) The other rail may be fixed to the top plate in any suitable manner. The grooves in which the balls run will be of such form as to give few points of contact, and the bearing-surface will thus be reduced to a minimum. The groove in each rail will have an upper and a lower bearing-surface for the balls, such surfaces being planes inclined from the horizontal, (clearly shown in Fig. 6,) and the balls, while having bearings on these planes, will not bear against the front and rear faces of the grooves. By this construction friction is reduced to a minimum, and the balls hold the carriage from lifting. Preferably there will be two balls in the rear groove and one in the front groove of the rails. The carriage is drawn along on the ball-bearings by a spring and chain or strap connection, as usual. The rear bar of the carriage-frame bears a rack-bar 10, having teeth extending upwardly. A rock-shaft 11 is supported in a bearing 12 above this rack 10, and an arm 13, secured to this rock-shaft 11, is connected by a pull-rod 14 with the key mechanism, so that the rock-shaft is rocked whenever a key is struck, the connection being well known in this art.

The rock-shaft 11 bears a pawl 15 directly over the rack-bar 10, and when arm 13 is drawn down this pawl 15 will engage one tooth of said rack.

The rock-shaft 11 has a short arm or cam-lever 16 extending at the side opposite said pawl 15, and for convenience said arm may be a part of the pawl, but extending alongside the rack 10.

A pawl 17 is pivoted to a bearing 18 on the top plate of bar $a'$ of the machine. This pawl 17 has a set-screw 20 projecting through an offset 19, so as to bear on the arm or cam-lever 16.

The pawl 15 is normally held out of engagement with the rack 10 by a spring in any suitable location, such a spring being indicated in a diagrammatic way at $e$, Fig. 7$^a$. The pawl 17 normally drops down and engages one tooth of the rack 10. When the arm 13 is drawn down, pawl 15 engages the next succeeding tooth of rack 10, and pawl 17 is lifted out of engagement with the rack by arm or cam-lever 16 bearing on screw 20. The rack-teeth on bar 11 and the carriage will thus be held alternately by the pawls 15 and 17, and will be permitted to move along the distance of a rack-tooth whenever shaft 11 is rocked by arm 13. The relation of the pawls 15 and 17 to each other can be regulated by screw 20.

A rocker-bar 30 is pivoted or hinged at each end of the carriage-frame and extends under a stud 31, projecting from the side of pawl 20. This bar can be rocked by lever 33, extending under a projection 34 on bar 30. The lever 33 is pivoted to the frame (near the end of the roller) at 35, and a finger-piece 36 extends to the front of the carriage.

Pawl 15 is normally out of engagement with rack 10. By depressing finger-piece 36 the lever 33 rocks bar 30 upward and lifts stud 31, and thus throws pawl 17 out of engagement with its rack, thus releasing the rack and carriage, so that the carriage may be moved in either direction. On removing the pressure from lever 33 the pawl 17 will engage whatever tooth of the rack is in front of it. A spring 37 bears the rocker-bar 30 down.

The margin regulator or gage 40 has rack-teeth 41 on its rear face, and is held against a rack 42 on the track or guide bar 3 by a spring 43, said spring being held against the gage by a screw 44, passing through a hole in the spring and a slot 45 in the gage. The upward projection 46 on the gage overhangs bar 3 to hold the gage square and serves as a stop against which the projection 39 on the rocker-bar 30 abuts when the rocker is down, thus limiting the movement of the rocker-bar 30 and the carriage to which the bar is attached. This determines the margin of the sheet in writing; but if it is desired to write outside the margin as a side note the rocker-bar 30 may be raised and the carriage moved to the extreme of its movement. The inclined face of the projection 46 will permit the projection 39 to ride over said projection 46 in one direction, rocking bar 30, but not enough to raise pawl 17.

A lever 47, pivoted to the lower face of track 3, engages the gage 40 and may press rack-teeth 41 of the gage out of contact with teeth 42 of the track-bar. The gage 40 can then be slipped along lengthwise of the machine, and when lever 47 is released the teeth 41 will again engage teeth 42 and hold gage 40 and its stop, stud, or abutment 46 in its newly-adjusted position, which will determine the marginal width.

The paper-holding roll or cylinder 50 has an axial shaft 51, which rests in guideways 52 on the carriage, and the roll is held in the carriage in the position shown in Fig. 1, in printing position, but is swung forward in the ways 52, so as to be close alongside the index 53, Fig. 6, to bring the last-written line of writing into position to be read by the operator.

The shaft 51 has its bearings in the end pieces or spiders 55 55. These end pieces or spiders 55 are connected by bars 56 and 57—one at each side of the roller—and the spiders and bars constitute a cradle, which is permanently connected to the roll.

The spiders 55 have each a projecting stud 58, which studs rest under the spring-hooks 59 of the carriage-frame $b$. These hooks are hung in standards 60, and are in a position midway of ways 52, so that the downward pressure of the spring-hooks will press the roll and cradle in either direction to the front or rear of the ways 52 from an intermediate position at which the hooks are raised to their greatest elevation above the ways 52.

The rear bar 56 of the cradle supports the paper guard or apron 65. This guard is pivotally hung to the cradle-bar 56. The end stays or strengthening strips 69 69 of the apron have bearings 70 for the paper pressing or feed roller 66. Curved fingers 68 conform generally to the curvature of the paper-holding roll 50, which they partially surround, and are extensions of said strips 69.

The apron 65 projects somewhat above the cradle-bar 56. Springs 70, secured to said bar, bear on the apron. These springs may loop round said bar 56 and be held by a set-screw. They bear against the apron and tend to press the lower end of the apron, roll 66, and fingers 68 close against the paper-roll 50 to guide and hold the paper against said roller.

When it is desired to apply a number of sheets of paper to the roller, a pressure against the rear side of apron 65 above its support throws the fingers 68 and roller 66 away from the paper-holding roll, leaving a space into which the paper can be readily fed.

The paper-holding roll or platen 50 is rotated by a pawl 21 engaging ratchet 22, the pawl being operated by handle 23 in usual manner, this construction being old. A spring-pawl 24 is attached to the end of the cradle by a rivet or screw 240 or in any other suitable manner. This pawl enters the notches between the teeth of the ratchet 22, and thus holds the ratchet against rotation, so that the ratchet and roller to which it is attached will not turn in the cradle without the application of some force. A bell-crank lever 25, hung in the bar 57, engages the spring-pawl, and by pressing on the lever 25 pawl 24 may be disengaged, and the roller is then free to turn in its bearings in the cradle.

I have described the best form of construction now used by me; but it will be understood that I intend to cover mechanical equivalents when such are substituted. For instance, the rocking bar 30 might have a similar or equivalent movement or function without being pivoted to the carriage, as shown.

The reversely-inclined faces of the guide-rails of the ball-bearings might be varied; the position of the rails might be reversed, and the rack 42 need not necessarily be on the rail, and various other mechanical changes might be made without departing from the spirit of my invention.

What I claim is—

1. In a type-writing machine, the combination, with the frame, of guide-rails having grooves in their sides, a carriage having grooves in the sides of its side rails, and bearing-balls interposed in the grooves, the carriage being thus supported on and held by the balls against any tendency to rise, substantially as described.

2. In a type-writing machine, the combination, with the frame and carriage, of bearing-rails on said frame and carriage, said rails having grooves in their sides, and bearing-balls interposed in the grooves thus formed, the carriage being thus held down by the balls, at least one of the guide-rails being adjustable, substantially as described.

3. In a type-writing machine, the combination, with the top plate of the machine, of a fixed rail and an adjustable rail thereon, the rails being provided with grooves in their outer faces, a carriage thereon having rails outside the rails of the top plate and having grooves on their inner faces, and anti-friction balls interposed in the grooves, substantially as described.

4. In a type-writer, the combination, with the guide-rails on the top plate having side grooves and bearing-surfaces therein inclined from the horizontal, of a carriage having complementary grooved rails with bearing-surfaces inclined in opposite direction from those of the frame-rails, and bearing-balls in said grooves, substantially as described.

5. The combination, with the carriage of a type-writer, of a rack-bar thereon, a rock-shaft supported on the frame having a pawl in position to engage said rack-bar, a second pawl independently supported on the frame in position to engage the rack-bar and to be disengaged by the first-mentioned pawl, and a set-screw by which the relative position of one pawl with relation to the other is controlled.

6. The combination, with the carriage of a type-writer, of a rack-bar thereon, a rock-shaft mounted on the frame having a pawl in position to engage the rack-bar, and an arm connected to said pawl which lifts as the pawl is depressed, and a second pawl mounted on the frame in position to engage the rack-bar and having a bearing on the arm of the first pawl so as to lift when the first pawl is depressed.

7. The combination, with the rail 3, of a movable margin-regulator thereon, the carriage, and a rocker-bar on the carriage in position to engage said margin-regulator and to swing away from the same as the bar rocks, substantially as described.

8. The combination, with the movable margin regulator or gage, of the carriage, a rocker-bar on the carriage having a projection in position to engage said margin-gage, and a lever extending to the front of the carriage by which the rocker-bar may be rocked out of position to engage said margin-regulator, substantially as described.

9. The combination, with the margin-gage having a tooth, of a spring bearing on said gage, a rack on the guide-rail with which said tooth engages, and a lever on the frame by which said tooth may be pressed out of engagement with said rack.

10. The combination, with the slotted margin-gage having a tooth, of a spring bearing against said gage, a screw passing through said spring and the slot in the gage, and a rack-bar into which said screw enters and with which said tooth engages, and a lever pivoted to the bar in position to press the gage-tooth out of engagement with the rack.

11. The combination, with the adjustable margin-gage having a projection with a plane face at one side and an inclined face at the other, of the carriage having a rocker-bar constructed to abut with the plane face of said gage but to ride over the inclined face when moving in reverse direction.

12. The combination, with the frame, of a margin-gage adjustably secured thereto and the carriage having a movable projection in position normally to engage the margin-gage and stop the carriage, but which when moved out of normal position permits a carriage movement to dispense with margin altogether.

13. The combination, with the cradle and the roller having a ratchet-wheel attached, of a spring-pawl attached to the cradle and engaging the teeth of the ratchet-wheel to lock the roller and cradle together, and a bell-crank lever hung in the cradle and bearing on said pawl to disengage the same from the ratchet, substantially as described.

In testimony whereof I affix my signature in presence of two witnesses.

ALEXANDER T. BROWN.

Witnesses:
 H. McMurchy,
 C. E. Dennison.